US 6,992,810 B2

(12) United States Patent
Pan et al.

(10) Patent No.: US 6,992,810 B2
(45) Date of Patent: *Jan. 31, 2006

(54) HIGH FILL RATIO REFLECTIVE SPATIAL LIGHT MODULATOR WITH HIDDEN HINGE

(75) Inventors: Shaoher X Pan, San Jose, CA (US); Xiao Yang, Sunnyvale, CA (US)

(73) Assignee: Miradia Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/849,364

(22) Filed: May 18, 2004

(65) Prior Publication Data

US 2004/0240033 A1    Dec. 2, 2004

Related U.S. Application Data

(63) Continuation of application No. 10/611,121, filed on Jun. 30, 2003, now abandoned, and a continuation-in-part of application No. 10/378,058, filed on Feb. 27, 2003, now abandoned, and a continuation-in-part of application No. 10/378,056, filed on Feb. 27, 2003, now abandoned, and a continuation-in-part of application No. 10/378,041, filed on Feb. 27, 2003, now abandoned.

(60) Provisional application No. 60/475,404, filed on Jun. 2, 2003, provisional application No. 60/390,389, filed on Jun. 19, 2002.

(51) Int. Cl.
*G02B 26/00* (2006.01)
(52) U.S. Cl. .................. 359/290; 359/291; 359/295
(58) Field of Classification Search ............... 359/290, 359/291, 295, 297, 223, 224, 298, 237, 238
See application file for complete search history.

(56) References Cited

U.S. PATENT DOCUMENTS

| | | |
|---|---|---|
| 4,229,732 A | 10/1980 | Hartstein et al. |
| 4,317,611 A | 3/1982 | Petersen |
| 4,566,935 A | 1/1986 | Hornbeck |
| 4,615,595 A | 10/1986 | Hornbeck |
| 5,061,049 A | 10/1991 | Hornbeck |
| 5,172,262 A | 12/1992 | Hornbeck |
| 5,311,360 A | 5/1994 | Bloom et al. |
| 5,382,961 A | 1/1995 | Gale, Jr. |
| 5,448,314 A | 9/1995 | Heimbuch et al. |
| 5,452,024 A | 9/1995 | Sampsell |
| 5,489,952 A | 2/1996 | Gove et al. |
| 5,504,614 A | 4/1996 | Webb et al. |

(Continued)

FOREIGN PATENT DOCUMENTS

EP    1237032 A2    9/2002

OTHER PUBLICATIONS

Henley, Francois J. and Current, Michael I., "A New SOI Maunufacturing Technology Using Atomic Layer Cleaving," Silicon Genesis Corporation, Campbell, CA, pp. 1-5.

(Continued)

*Primary Examiner*—Ricky L. Mack
*Assistant Examiner*—Brandi Thomas
(74) *Attorney, Agent, or Firm*—Townsend and Townsend and Crew LLP

(57) ABSTRACT

A micro mirror array having a hidden hinge that is useful, for example, in a reflective spatial light modulator. In one embodiment, the micro mirror array includes spacer support walls, a hinge, a mirror plate and a reflective surface on the upper surface of the mirror plate, the reflective surface concealing the hinge and the mirror plate. The micro mirror array fabricated from a single material.

35 Claims, 14 Drawing Sheets

U.S. PATENT DOCUMENTS

| | | |
|---|---|---|
| 5,535,047 A | 7/1996 | Hornbeck |
| 5,583,688 A | 12/1996 | Hornbeck |
| 5,589,852 A | 12/1996 | Thompson et al. |
| 5,600,383 A | 2/1997 | Hornbeck |
| 5,661,591 A | 8/1997 | Lin et al. |
| 5,663,749 A | 9/1997 | Farris et al. |
| 5,742,419 A | 4/1998 | Dickensheets et al. |
| 5,757,536 A | 5/1998 | Ricco et al. |
| 5,793,519 A | 8/1998 | Furlani et al. |
| 5,835,256 A | 11/1998 | Huibers |
| 5,885,468 A | 3/1999 | Kozlowski |
| 5,939,171 A | 8/1999 | Biebl |
| 5,999,306 A | 12/1999 | Atobe et al. |
| 6,038,056 A | 3/2000 | Florence et al. |
| 6,046,840 A | 4/2000 | Huibers |
| 6,049,317 A | 4/2000 | Thompson et al. |
| 6,127,756 A | 10/2000 | Iwaki et al. |
| 6,172,797 B1 | 1/2001 | Huibers |
| 6,201,521 B1 | 3/2001 | Doherty |
| 6,252,277 B1 | 6/2001 | Chan et al. |
| 6,285,490 B1 | 9/2001 | Meier et al. |
| 6,323,982 B1 | 11/2001 | Hornbeck |
| 6,337,760 B1 | 1/2002 | Huibers et al. |
| 6,356,378 B1 | 3/2002 | Huibers |
| 6,388,661 B1 | 5/2002 | Richards |
| 6,396,619 B1 | 5/2002 | Huibers et al. |
| 6,429,033 B1 | 8/2002 | Gee et al. |
| 6,529,310 B1 | 3/2003 | Huibers et al. |
| 6,538,800 B2 | 3/2003 | Huibers |
| 6,542,653 B2 | 4/2003 | Wu et al. |
| 6,543,286 B2 | 4/2003 | Garverick et al. |
| 6,809,852 B2 | 10/2004 | Tao et al. |
| 6,820,988 B2 | 11/2004 | van Drieenhuizen |
| 6,827,866 B1 | 12/2004 | Novotny |
| 6,856,068 B2 | 2/2005 | Miller et al. |
| 6,891,654 B2 | 5/2005 | Kurosawa et al. |
| 6,891,655 B2 | 5/2005 | Grebinski et al. |
| 2002/0041455 A1 | 4/2002 | Sawada et al. |
| 2002/0071166 A1 | 6/2002 | Jin et al. |
| 2002/0071169 A1 | 6/2002 | Bowers et al. |
| 2002/0132389 A1 | 9/2002 | Patel et al. |
| 2003/0117686 A1 | 6/2003 | DiCarlo |
| 2003/0207487 A1 | 11/2003 | Kubena et al. |
| 2004/0000696 A1 | 1/2004 | Ma et al. |
| 2004/0004753 A1 | 1/2004 | Pan |
| 2004/0008402 A1 | 1/2004 | Patel et al. |
| 2004/0125347 A1 * | 7/2004 | Patel et al. ................... 353/98 |
| 2004/0136044 A1 * | 7/2004 | Miller et al. ................ 359/223 |
| 2004/0184133 A1 * | 9/2004 | Su et al. ..................... 359/290 |
| 2004/0190817 A1 * | 9/2004 | Aubuchon .................... 385/18 |
| 2005/0041277 A1 * | 2/2005 | Huibers ...................... 359/286 |

OTHER PUBLICATIONS

Petersen, K.E., Micromechanical Light Modulator Array Fabricated On Silicon, Applied Physics Letters, Oct. 15, 1977, pp. 521-523, vol. 31, No. 8.

Petersen, K.E., Micromechanical Membrane Switches On Silicon, IBM J. Res. Develop., Jul. 1979, pp. 376-385, vol. 23, No. 4.

* cited by examiner

HIGH FILL RATIO REFLECTIVE SPATIAL LIGHT MODULATOR WITH HIDDEN HINGE

CROSS-REFERENCE TO RELATED APPLICATION

The present application is a continuation of application Ser. No. 10/611,121, "High Fill Ratio Reflective Spatial Light Modulator with Hidden Hinge," filed Jun. 30, 2003 now abandoned, which claims priority from provisional U.S. Patent Application Ser. No. 60/475,404, for "Hidden Hinge High Fill Ratio Reflective Spatial Light Modulator," filed Jun. 2, 2003, the disclosure of which is incorporated by reference. This application also is a continuation-in-part of application Ser. No. 10/378,056, for "Reflective Spatial Light Modulator," filed Feb. 27, 2003 now abandoned, the disclosure of which is incorporated by reference, which claims the benefit of provisional U.S. Patent Application Ser. No. 60/390,389, for "Reflective Spatial Light Modulator," filed Jun. 19, 2002. This application also is a continuation-in-part of application Ser. No. 10/378,041, for "Fabrication of a Reflective Spatial Light Modulator," filed Feb. 27, 2003 now abandoned, the disclosure of which is incorporated by reference, which claims the benefit of provisional U.S. Patent Application Ser. No. 60/390,389, for "Reflective Spatial Light Modulator," filed Jun. 19, 2002. This application also is a continuation-in-part of application Ser. No. 10/378,058, for "Architecture of a Reflective Spatial Light Modulator," filed Feb. 27, 2003 now abandoned, the disclosure of which is incorporated by reference, which claims the benefit of provisional U.S. Patent Application Ser. No. 60/390,389, for "Reflective Spatial Light Modulator," filed Jun. 19, 2002.

FIELD OF THE INVENTION

This invention relates to spatial light modulators (SLMs), and more particularly to a micro mirror structure with hidden hinges to maximize pixel fill ratio, minimize scattering and diffraction, and achieve a high contrast ratio and high image quality.

BACKGROUND OF THE INVENTION

Spatial light modulators (SLMs) have numerous applications in the areas of optical information processing, projection displays, video and graphics monitors, televisions, and electrophotographic printing. Reflective SLMs are devices that modulate incident light in a spatial pattern to reflect an image corresponding to an electrical or optical input. The incident light may be modulated in phase, intensity, polarization, or deflection direction. A reflective SLM is typically comprised of an area or two-dimensional array of addressable picture elements (pixels) capable of reflecting incident light. A key parameter of SLMs, especially in display applications, is the portion of the optically active area to the pixel area (also measured as the fraction of the SLM's surface area that is reflective to the total surface area of the SLM, also called the "fill ratio"). A high fill ratio is desirable.

Prior art SLMs have various drawbacks. These drawbacks include, but are not limited to: (1) a lower than optimal optically active area that reduces optical efficiency; (2) rough reflective surfaces that reduce the reflectivity of the mirrors; (3) diffraction and scattering that lowers the contrast ratio of the display; (4) use of materials that have long-term reliability problems; and (5) complex manufacturing processes that increase the expense and lower the yield of the device.

Many prior art devices include substantial non-reflective areas on their surfaces. This provides low fill ratios, and provides lower than optimum reflective efficiency. For example, U.S. Pat. No. 4,229,732 discloses MOSFET devices that are formed on the surface of a device in addition to mirrors. These MOSFET devices take up surface area, reducing the fraction of the device area that is optically active and reducing reflective efficiency. The MOSFET devices on the surface of the device also diffract incident light, which lowers the contrast ratio of the display. Further, intense light striking exposed MOSFET devices interfere with the proper operation of the devices, both by charging the MOSFET devices and overheating the circuitry.

Some SLM designs have rough surfaces that scatter incident light and reduce reflective efficiency. For example, in some SLM designs the reflective surface is an aluminum film deposited on an LPCVD silicon nitride layer. It is difficult to control the smoothness of these reflective mirror surfaces as they are deposited with thin films. Thus, the final product has rough surfaces, which reduce the reflective efficiency.

Another problem that reduces reflective efficiency with some SLM designs, particularly in some top hanging mirror designs, is large exposed hinge surface areas. These exposed hinge surface areas result in scattering and diffraction due to the hinge structure, which negatively impacts contrast ratio, among other parameters.

Many conventional SLMs, such as the SLM disclosed in U.S. Pat. No. 4,566,935, have hinges made of aluminum alloy. Aluminum, as well as other metals, is susceptible to fatigue and plastic deformation, which can lead to long-term reliability problems. Also, aluminum is susceptible to cell "memory," where the rest position begins to tilt towards its most frequently occupied position. Further, the mirrors disclosed in the U.S. Pat. No. 4,566,935 are released by removing sacrificial material underneath the mirror surface. This technique often results in breakage of the delicate micro mirror structures during release. It also requires large gaps between mirrors in order for etchants to remove the sacrificial material underneath the mirrors, which reduce the fraction of the device area that is optically active.

Other conventional SLMs require multiple layers including a separate layer for the mirrors, hinges, electrodes and/or control circuitry. Manufacturing such a multi-layer SLM requires use of multi-layer thin film stacking and etching techniques and processes. Use of these techniques and processes is expensive and produces lower yields. For example, use of these techniques often involves extensive deposition and removal of sacrificial materials underneath the surface of the mirror plates. Multi-layer thin film deposition and stacking underneath the surface of the mirror plate typically results in rougher mirror surfaces, thereby reducing the reflective efficiency of the mirrors. Moreover, having the mirror and the hinge in a different layer or substrate results in translational displacement upon deflection of the mirror. With translational displacements, the mirrors in an array must be spaced to avoid mechanical interference among adjacent mirrors. Because the mirrors in the array cannot be located too closely to the other mirrors in the array, the SLM suffers from a lower than optimal optically active area or lower fill ratio.

What is desired is an SLM with improved reflective efficiency, SLM device long-term reliability, and simplified manufacturing processes.

SUMMARY OF THE INVENTION

The present invention is a spatial light modulator (SLM). In one embodiment, the SLM has a reflective selectively deflectable micro mirror array fabricated from a first substrate bonded to a second substrate having individually addressable electrodes. The second substrate may also have addressing and control circuitry for the micro mirror array. Alternatively, portions of the addressing and control circuitry are on a separate substrate and connected to the circuitry and electrodes on the second substrate.

The micro mirror array includes a controllably deflectable mirror plate with a highly reflective surface to reflect incident light. The mirror plate is connected to a hinge by a connector. The hinge is in turn connected to a spacer support frame with spacer support walls. The hinge is substantially concealed under the reflective surface. By hiding the hinge substantially under the reflective surface, the amount of scattering and diffraction due to light hitting and reflecting off of an exposed hinge structure is eliminated, thereby maximizing the contrast ratio of the device.

The mirror plate, the connector, the hinge, the spacer support frame, and the spacer support walls are fabricated from a first substrate. This first substrate is a wafer of a single material, single crystal silicon in one embodiment. The spacer support walls provide separation between the mirror plate and an electrode associated with that mirror plate that controls the deflection of the mirror plate. The electrode is located on the second substrate and the second substrate is bonded to the micro mirror array.

Because the hinge and the mirror plate are in the same substrate (i.e., in the same layer), there is no translational movement or displacement as the mirror rotates about the longitudinal axis of the hinge. With no translational displacement, the gap between the mirrors and the support walls are limited only by the fabrication technology and process. The close spacing of the mirror plates and the hiding of by positioning the hinge substantially beneath the reflective surface allow for a high fill ratio for the micro mirror array, improved contrast ratio, minimized scattering and diffraction of light, and virtual elimination of light passing through the micro mirror array to strike the circuitry on the second substrate.

Further, because the mirror plate and the hinge are fabricated from a single crystal silicon material in a preferred embodiment, the resulting hinge is stronger and more reliable and suffers virtually from no memory effect, fractures along grain boundaries or fatigue. A single crystal silicon substrate has significantly fewer micro defects and cracks than other materials, especially deposited thin films. As a result, it is less likely to fracture (or to propagate micro fractures) along grain boundaries in a device. Also, use of a single substrate as in the present invention minimizes the use of multi-layer thin film stacking and etching processes and techniques.

The net result is an SLM that can achieve high optical efficiency and performance to produce high quality images reliably and cost-effectively.

BRIEF DESCRIPTION OF THE DRAWINGS

FIG. 2a is a perspective view of a single micro mirror in one embodiment of the invention.

FIG. 2b is a perspective view of a corner of the micro mirror of FIG. 2a.

FIG. 8 is a cross sectional view of the deflected micro mirror shown in FIG. 2a.

FIG. 9b is a perspective view of a corner of the micro mirror of FIG. 9a.

DETAILED DESCRIPTION OF THE PREFERRED EMBODIMENTS

The reflective spatial light modulator ("SLM") 100 has an array 103 of deflectable mirrors 202. Individual mirrors 202 can be selectively deflected by applying a voltage bias between that mirror 202 and a corresponding electrode 126. The deflection of each mirror 202 controls light reflected from a light source to a video display. Thus, controlling the deflection of a mirror 202 allows light striking that mirror 202 to be reflected in a selected direction, and thereby allows control of the appearance of a pixel in the video display.

Figure 1:
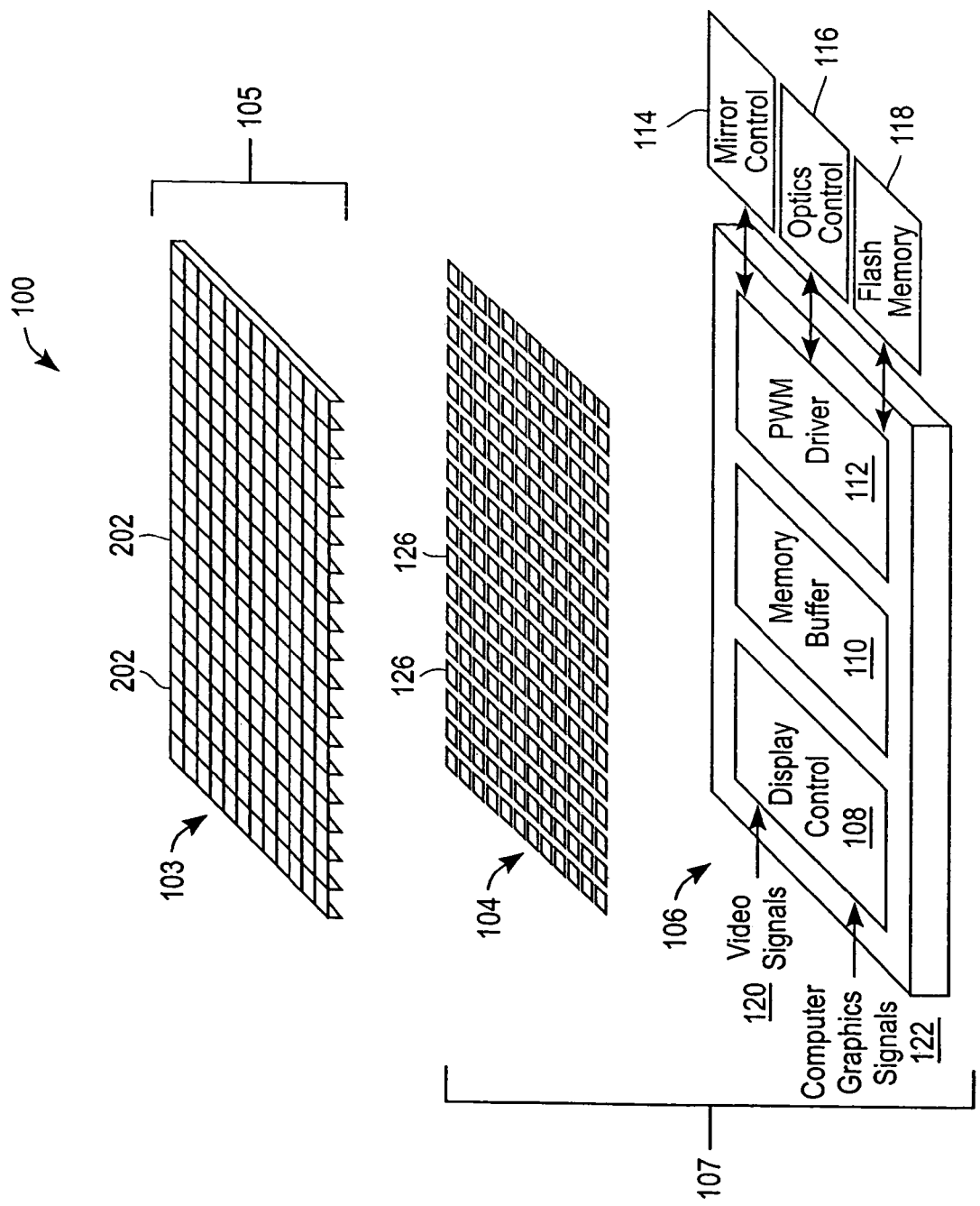
FIG. 1 is a schematic diagram that illustrates the general architecture of a spatial light modulator according to one embodiment of the invention.

Spatial Light Modulator Overview:

FIG. 1 is a schematic diagram that illustrates the general architecture of an SLM 100 according to one embodiment of the invention. The illustrated embodiment has three layers. The first layer is a mirror array 103 that has a plurality of deflectable micro mirrors 202. In one preferred embodiment, the micro mirror array 103 is fabricated from a first substrate 105 that is a single material, such as single crystal silicon.

The second layer is an electrode array 104 with a plurality of electrodes 126 for controlling the micro mirrors 202. Each electrode 126 is associated with a micro mirror 202 and controls the deflection of that micro mirror 202. Addressing circuitry allows selection of a single electrode 126 for control of the particular micro mirror 202 associated with that electrode 126.

The third layer is a layer of control circuitry 106. This control circuitry 106 has addressing circuitry, which allows the control circuitry 106 to control a voltage applied to selected electrodes 126. This allows the control circuitry 106 to control the deflections of the mirrors 202 in the mirror array 103 via the electrodes 126. Typically, the control circuitry 106 also includes a display control 108, line memory buffers 110, a pulse width modulation array 112, and inputs for video signals 120 and graphics signals 122. A micro controller 114, optics control circuitry 116, and a flash memory 118 may be external components connected to the control circuitry 106, or may be included in the control circuitry 106 in some embodiments. In various embodiments, some of the above listed parts of the control circuitry 106 may be absent, may be on a separate substrate and connected to the control circuitry 106, or other additional components may be present as part of the control circuitry 106 or connected to the control circuitry 106.

In one embodiment, both the second layer 104 and the third layer 106 are fabricated using semiconductor fabrication technology on a single second substrate 107. That is, the second layer 104 is not necessarily separate and above the third layer 106. Rather, the term "layer" is an aid for conceptualizing different parts of the spatial light modulator 100. For example, in one embodiment, both the second layer 104 of electrodes 126 is fabricated on top of the third layer of control circuitry 106, both fabricated on a single second substrate 107. That is, the electrodes 126, as well as the display control 108, line memory buffers 110, and the pulse width modulation array 112 are all fabricated on a single substrate in one embodiment. Integration of several functional components of the control circuitry 106 on the same substrate provides an advantage of improved data transfer rate over conventional spatial light modulators, which have the display control 108, line memory buffers 110, and the pulse width modulation array 112 fabricated on a separate substrate. Further, fabricating the second layer of the electrode array 104 and the third layer of the control circuitry 106 on a single substrate 107 provides the advantage of simple and cheap fabrication, and a compact final product.

After the layers 103 and 107 are fabricated, they are bonded together to form the SLM 100. The first layer with the mirror array 103 covers the second and third layers 104 and 106, collectively 107. The area under the mirrors 202 in the mirror array 103 determines how much room there is beneath the first layer 103 for the electrodes 126, and addressing and control circuitry 106. There is limited room beneath the micro mirrors 202 in the mirror array 103 to fit the electrodes 126 and the electronic components that form the display control 108, line memory buffers 110, and the pulse width modulation array 112. The present invention integrates many more items, such as display control 108, line memory buffers 110 and pulse width modulation array 112 on the same substrate as the electrodes 126, in the limited area beneath the micro mirrors in the micro mirror array 103. Including such control circuitry 106 on the same substrate 107 as the electrodes 126 improves the performance of the SLM 100. In other embodiments, various combinations of the electrodes 126 and components of the control circuitry may be fabricated on different substrates and electrically connected.

Figures 2A, 2B:
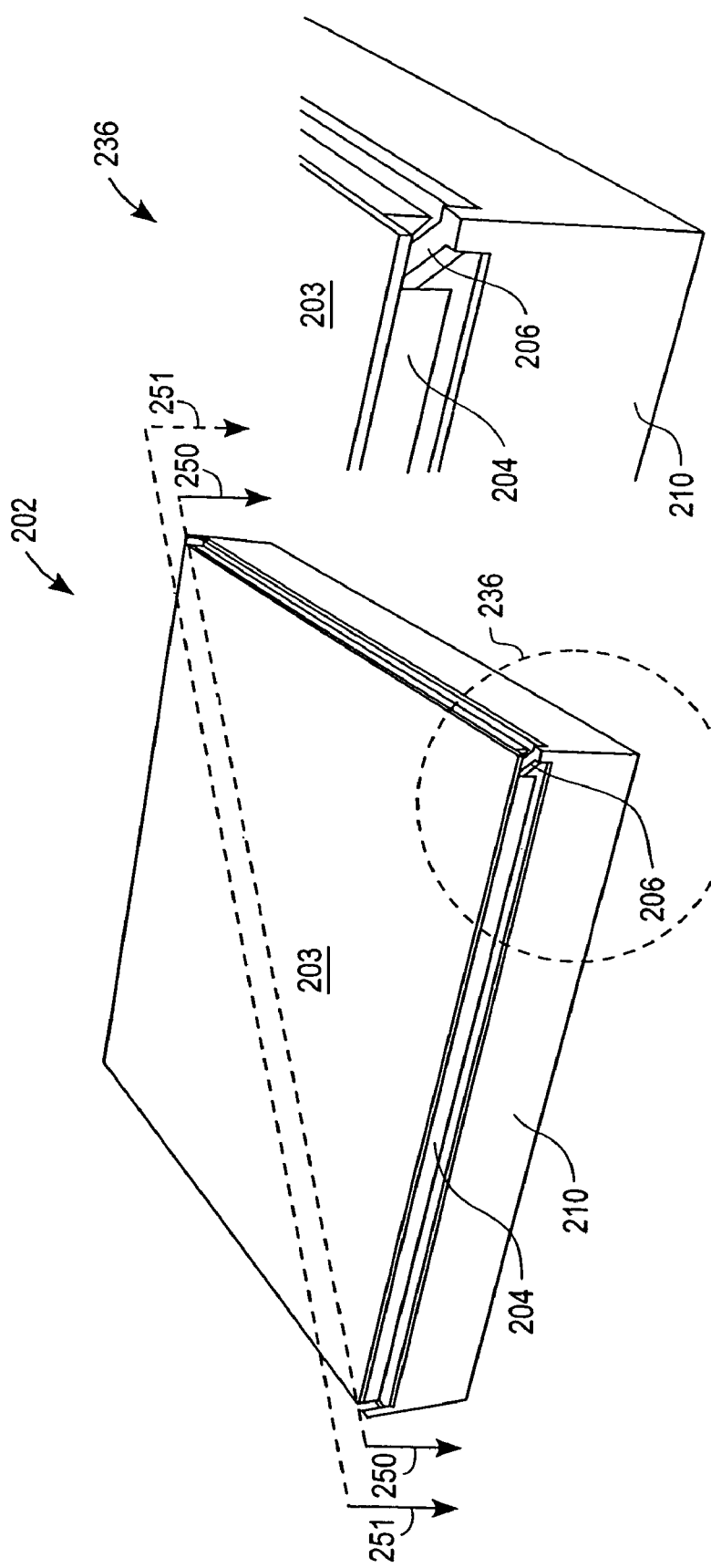

The Mirror:

FIG. 2a is a perspective view of one embodiment of a single micro mirror 202, and FIG. 2b is a more detailed perspective view of a corner 236 of the micro mirror 202 shown in FIG. 2a. In one preferred embodiment, the micro mirror 202 includes at least one mirror plate 204, a hinge 206, a connector 216 and a reflective surface 203. In an alternate embodiment, the micro mirror 202 further includes a spacer support frame 210 for supporting the mirror plate 204, hinge 206, reflective surface 203 and connector 216. Preferably, the mirror plate 204, hinge 206, connector 216 and spacer support frame 210 are fabricated from a wafer of a single material, such as single crystal silicon. Thus, the first substrate 105 shown in FIG. 1 in such an embodiment is a wafer of single crystal silicon. Fabricating the micro mirror 202 out of a single material wafer greatly simplifies the fabrication of the mirror 202. Further, single crystal silicon can be polished to create smooth mirror surfaces that have an order of magnitude smoother surface roughness than those of deposited films. Mirrors 202 fabricated from single crystal silicon are mechanically rigid, which prevents undesired bending or warping of the mirror surface, and hinges fabricated from single crystal silicon are stronger, more reliable and suffer from virtually no memory effect, fractures along grain boundaries or fatigue, all of which are common with hinges made of from many other materials used in micro mirror arrays. In other embodiments, other materials may be used instead of single crystal silicon. One possibility is the use of another type of silicon (e.g. polysilicon, or amorphous silicon) for the micro mirror 202, or even making the mirror 202 completely out of a metal (e.g. an aluminum alloy, or tungsten alloy). Also, use of a single substrate as in the present invention avoids the use of multi-layer thin film stacking and etching processes and techniques.

Figure 3:
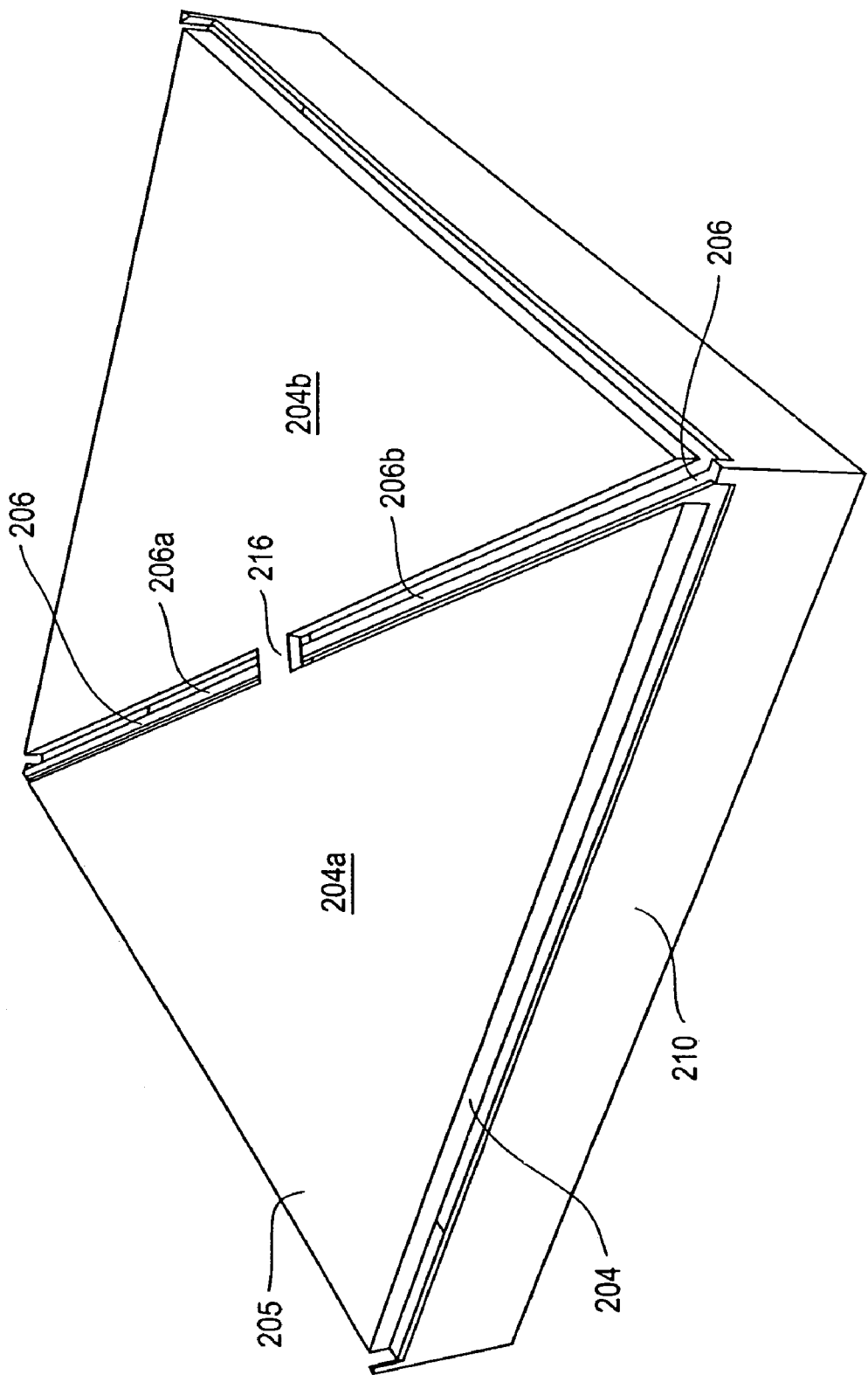
FIG. 3 is a perspective view of a single micro mirror without the reflective surface showing the top and sides of a mirror plate of a micro mirror array in one embodiment of the invention.
Figure 7A:
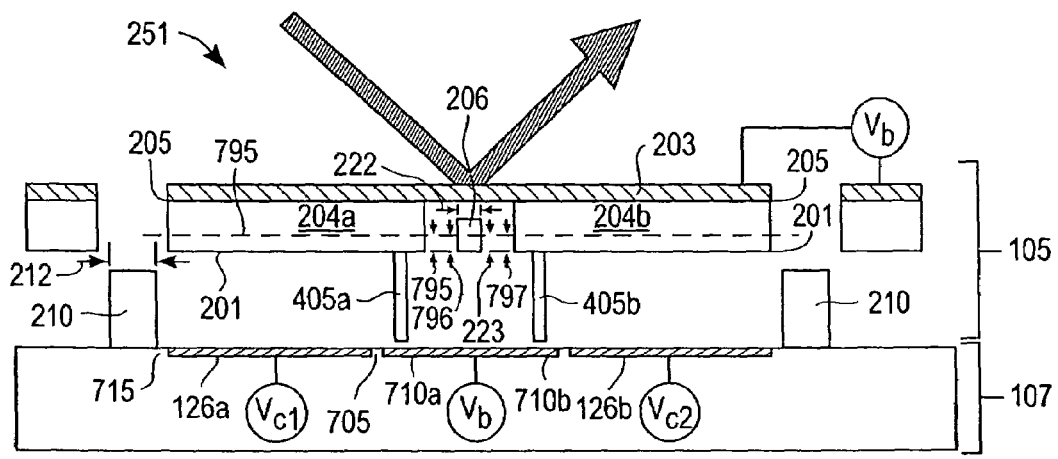
FIG. 7a is a cross sectional view of the undeflected micro mirror shown in FIG. 2a along an offset diagonal cross section.
Figure 7B:
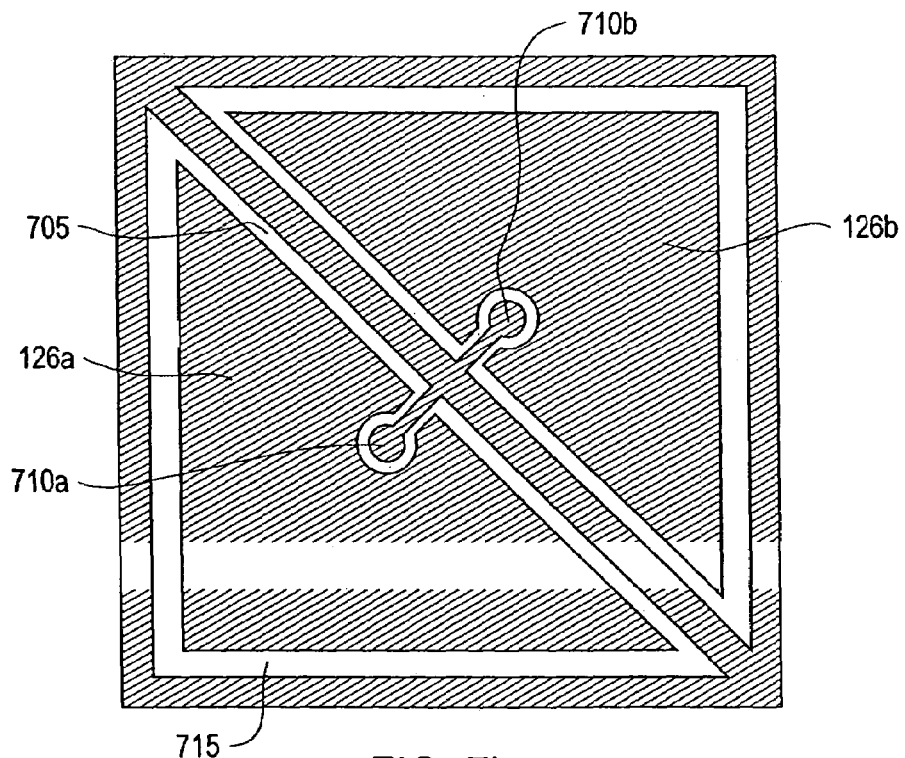
FIG. 7b is a top view of the electrodes and landing tips beneath a mirror plate formed in the second substrate in one embodiment of the invention.

As shown in FIGS. 2a–b, 3, 4a–b, 7a and 8 and as mentioned above, the micro mirror 202 has a mirror plate 204. This mirror plate 204 is the portion of the micro mirror 202 that is coupled to the hinge 206 by a connector 216 and selectively deflected by applying a voltage bias between the mirror 202 and a corresponding electrode 126. The mirror plate 204 in the embodiment shown in FIG. 3 includes triangular portions 204a and 204b. In the embodiment shown in FIGS. 9a, 9b and 10, the mirror plate 204 is substantially square in shape, and approximately fifteen microns by fifteen microns, for an approximate area of 225 square microns, although other shapes and sizes are also possible. The mirror plate 204 has an upper surface 205 and a lower surface 201. The upper surface 205 is preferably a highly smooth surface, with a measure of roughness of less than 2 angstroms root mean square and preferably constituting a large proportion of the surface area of the micro mirror 204. On the upper surface 205 of the mirror plate 204 and above a portion of the hinge 206 is deposited a reflective material 203, such as aluminum or any other highly reflective material. Preferably this reflective material 203 has a thickness of 300 A or less. The thinness of the reflective material or surface 203 ensures that it inherits the flat, smooth surface of the upper surface 205. This reflective surface 203 has an area greater than the area of the upper surface 205 of the mirror plate 204, and reflects light from a light source at an angle determined by the deflection of the mirror plate 204. Note that a torsion spring hinge 206 is formed substantially beneath the upper surface 205 of the mirror plate 204 and is substantially concealed by the reflective surface 203 that is deposited on the upper surface 205 and above a portion of the hinge 206. The difference between FIGS. 2a and 3 is that FIG. 2a illustrates a mirror plate 204 with the reflective surface 203 added on the upper surface 205 and substantially concealing the hinge 206, whereas FIG. 3 illustrates the mirror plate 204 without a reflective surface 203 and, therefore, revealing the hinge 206. Because the hinge 206 and the mirror plate 204 are in the same substrate 105 and, as illustrated in FIGS. 7a and 7b, the center height 796 of the hinge 206 is substantially coplanar 795 with the center height 795 or 797 of the mirror plate 204, there is no translational movement or displacement as the mirror 202 rotates about the longitudinal axis of the hinge 206. With no translational displacement, the gap between the mirror plate 204 and the support spacer walls of the spacer support frame 210 need only be limited by the limitations of the fabrication technology and process, typically less than 0.1 micron. The close spacing of the mirror plate 204 and the hiding of the hinge 206 substantially beneath the reflective surface 203 allow for a high fill ratio for the micro mirror array 103, improved contrast ratio, minimized scattering and diffraction of light, and virtual elimination of light passing through the micro mirror array 103 to strike the circuitry on the second substrate 107.

Figure 8:
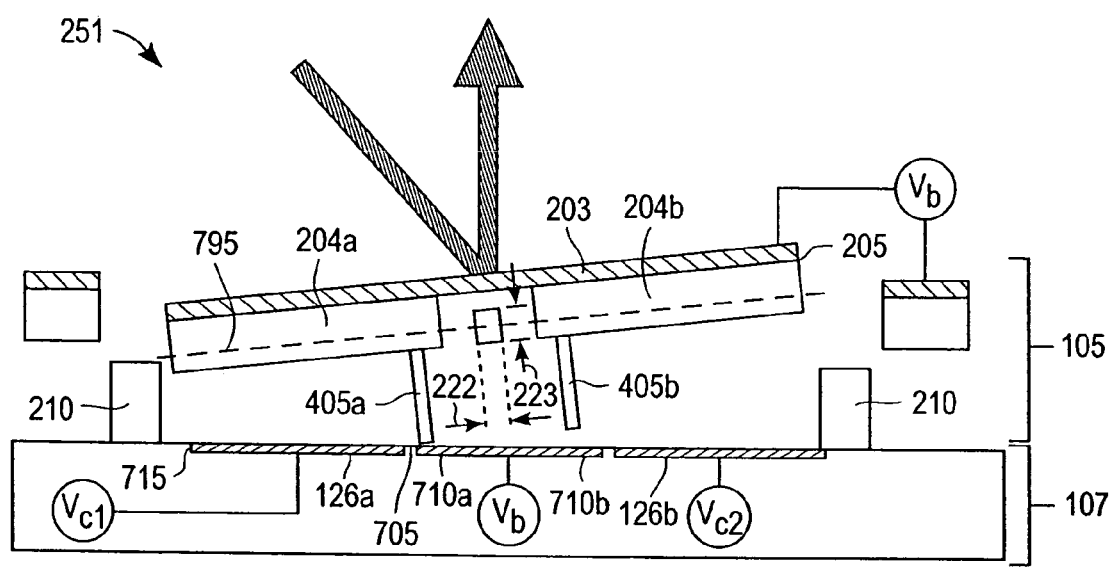
Figure 9A:
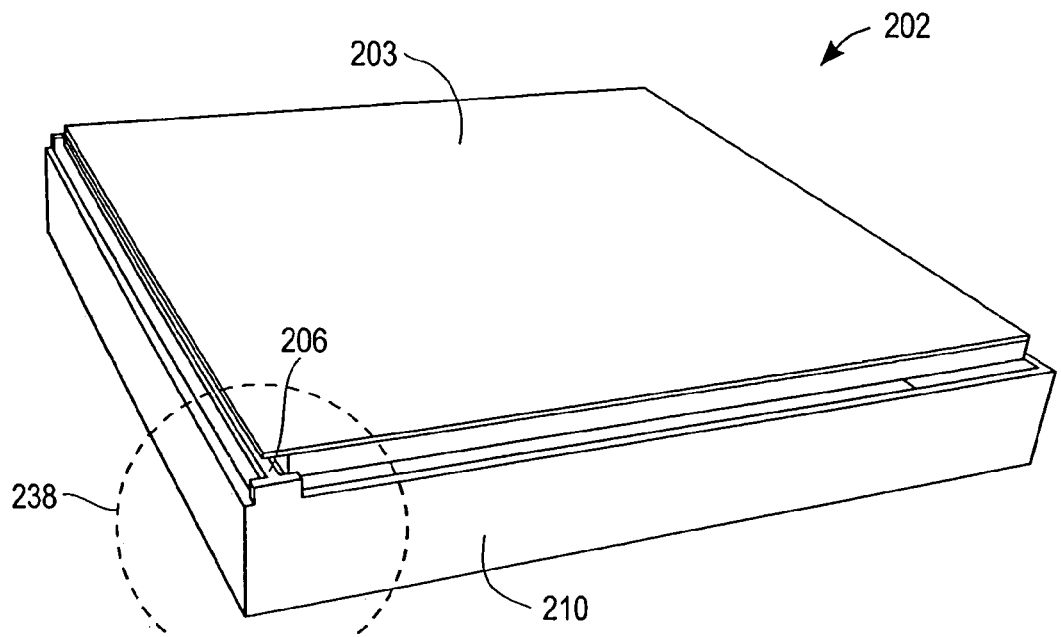
FIG. 9a is a perspective view showing the top and sides of an alternative embodiment of a micro mirror.
Figure 9B:
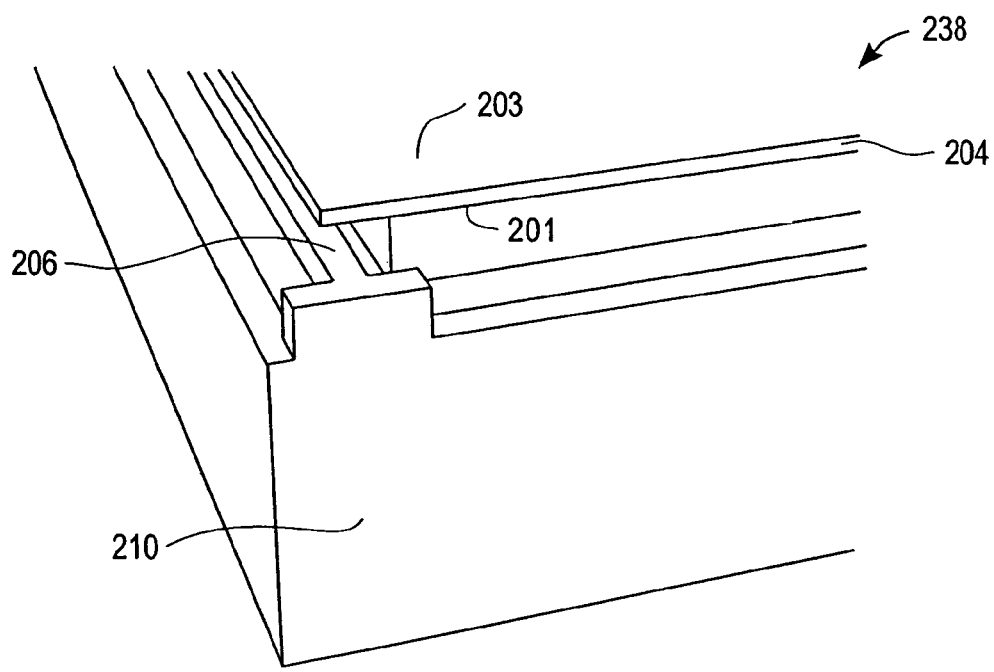
Figure 10:
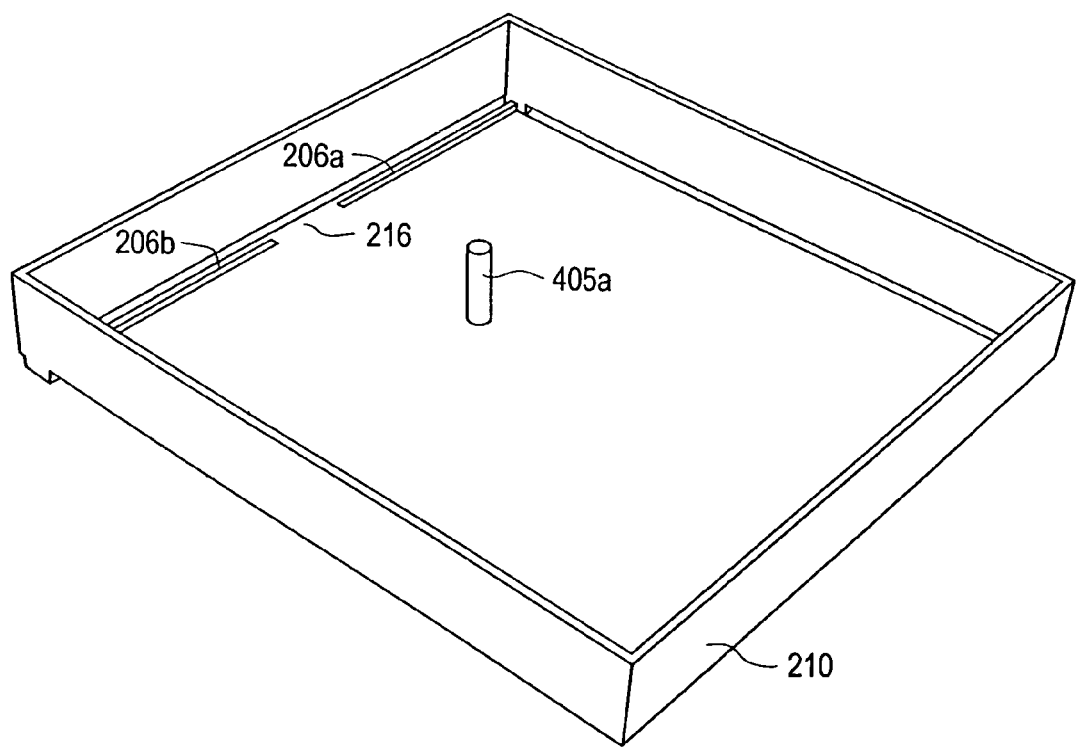
FIG. 10 is a perspective view showing the bottom and sides of an alternative embodiment of a micro mirror.

As illustrated in FIGS. 2a–b, 3, 4a–b, 7a, 8, 9a, 9b and 10, the mirror plate 204 is connected to a torsion spring hinge 206 by a connector 216. The torsion spring hinge 206 is connected to a spacer support frame 210, which holds the torsion spring hinge 206, the connector 216 and the mirror plates 204 in place. The hinge 206 includes a first arm 206a and a second arm 206b. Each arm, 206a and 206b, has two ends, one end connected to the spacer support frame 210 and the other end connected to the connector 216 as shown in FIGS. 3 and 10. Other springs, hinges and connection schemes among the mirror plate 204, the hinge 206, and spacer support frame 210 could also be used in alternative embodiments. As most clearly illustrated in FIGS. 3 and 4a, the torsion hinge 206 is preferably diagonally oriented (e.g., at a 45 degree angle) with respect to the spacer support wall 210, and divides the mirror plate 204 into two parts, or sides: a first side 204a and a second side 204b. As shown in FIG. 7b, two electrodes 126 are associated with the mirror 202, one electrode 126 for a first side 204a and one electrode 126 for a second side 204b. This allows either side 204a or 204b to be attracted to one of the electrodes 126a or 126b beneath and pivot downward and provides wide range of angular motion. The torsion spring hinge 206 allows the mirror plate 204 to rotate relative to the spacer support frame 210 about a longitudinal axis of the hinge 206 when a force such as an electrostatic force is applied to the mirror plate 204 by applying a voltage between the mirror 202 and the corresponding electrode 126. This rotation produces the angular deflection for reflecting light in a selected direction. Since the hinge 206 and the mirror plate 204 are in the same substrate 105 and, as illustrated in FIGS. 7a and 7b, the center height 796 of the hinge 206 is substantially coplanar 795 with the center height 795 or 797 of the mirror plate 204, the mirror 202 moves about the hinge 206 in pure rotation with no translational displacement. In one embodiment shown in FIGS. 7a and 8, the torsion spring hinge 206 has a width 222 that is smaller than the depth 223 of the hinge 206 (perpendicular to the upper surface 205 of the mirror plate 204). The width 222 of the hinge 206 is preferably between about 0.12 microns to about 0.2 microns, and the depth 223 is preferably between about 0.2 microns to about 0.3 microns.

As shown in FIGS. 2a–b, 3, 4a–b, 6 and 7a, the spacer support frame 210 positions the mirror plate 204 at a pre-determined distance above the electrodes 126 and addressing circuitry so that the mirror plate 204 may deflect downward to a predetermined angle. The spacer support frame 210 includes spacer support walls that are preferably formed from the same first substrate 105 and preferably positioned orthogonally as illustrated in FIGS. 2a, 4a, 9a and 10. These walls also help define the height of the spacer support frame 210. The height of the spacer support frame 210 is chosen based on the desired separation between the mirror plates 204 and the electrodes 126, and the topographic design of the electrodes. A larger height allows more deflection of the mirror plate 204, and a higher maximum deflection angle. A larger deflection angle generally provides a higher contrast ratio. In one embodiment, the deflection angle of the mirror plate 204 is 12 degrees. In a preferred embodiment, the mirror plate 204 can rotate as much as 90 degrees if provided sufficient spacing and drive voltage. The spacer support frame 210 also provides support for the hinge 206 and spaces the mirror plate 204 from other mirror plates 204 in the mirror array 103. The spacer support frame 210 has a spacer wall width 212, which, when added to a gap between the mirror plate 204 and the support frame 210, is substantially equal to the distance between adjacent mirror plates 204 of adjacent micro mirrors 202. In one embodiment, the spacer wall width 212 is 1 micron or less. In one preferred embodiment, the spacer wall width 212 is 0.5 microns or less. This places the mirror plates 204 closely together to increase the fill ratio of the mirror array 103.

In some embodiments, the micro mirror 202 includes elements 405a and 405b that stop the deflection of the mirror plate 204 when the plate 204 has deflected downward to a predetermined angle. Typically, these elements may include a motion stop 405a or 405b and landing tip 710a or 710b. As illustrated in FIGS. 4a, 6, 7a, 7b, 8, 10 and 12, when the mirror surface 204 deflects, the motion stop 405a or 405b on the mirror plate 204 contacts the landing tip 710 (either 710a or 710b). When this occurs, the mirror plate 204 can deflect no further. There are several possible configurations for the motion stop 405a or 405b and the landing tip 710a or 710b. In the embodiments illustrated in FIGS. 4a, 6, 7a, 8, 10 and 12, the motion stop is a cylindrical column or mechanical stop 405a or 405b attached to the lower surface 201 of the mirror plate 204, and the landing tip 710 is a corresponding circular area on the second substrate 107. In the embodiment shown in FIGS. 7a, 7b and 8, landing tips 710a and 710b are electrically connected to the spacer support frame 210, and hence has zero voltage potential difference relative to the motion stop 405a or 405b to prevent sticking or welding of the motion stop 405a or 405b to the landing tip 710a or 710b, respectively. Thus, when the mirror plate 204 is rotated relative to the spacer support frame 210 beyond a predetermined angle (as determined by the length and location of the mechanical stop 405a or 405b), the mechanical motion stop 405a or 405b will come into physical contact with the landing tip 710a or 710b, respectively, and prevent any further rotation of the mirror plate 204.

In a preferred embodiment, a motion stop 405a or 405b is fabricated from the first substrate 105 and from the same material as the mirror plate 204, hinge 206, connector 216 and spacer support frame 210. The landing tip 710a or 710b is also preferably made of the same material as the motion stop 405a or 405b, mirror plate 204, hinge 206, connector 216 and spacer support frame 210. In embodiments where the material is single crystal silicon, the motion stop 405a or 405b and landing tip 710a or 710b are therefore made out of a hard material that has a long functional lifetime, which allows the mirror array 103 to last a long time. Further, because single crystal silicon is a hard material, the motion stop 405a or 405b and landing tip 710a or 710b can be fabricated with a small area where the motion stop 450a or 405b contacts the landing tip 710a or 710b, respectively, which greatly reduces sticking forces and allows the mirror plate 204 to deflect freely. Also, this means that the motion stop 405a or 405b and landing tip 710a or 710b remain at the same electrical potential, which prevents sticking that would occur via welding and charge injection processes were the motion stop 405a or 405b and landing tip 710a or 710b at different electrical potentials. The present invention is not limited to the elements or techniques for stopping the deflection of the mirror plate 204 described above. Any elements and techniques known in the art may be used.

Figure 4:
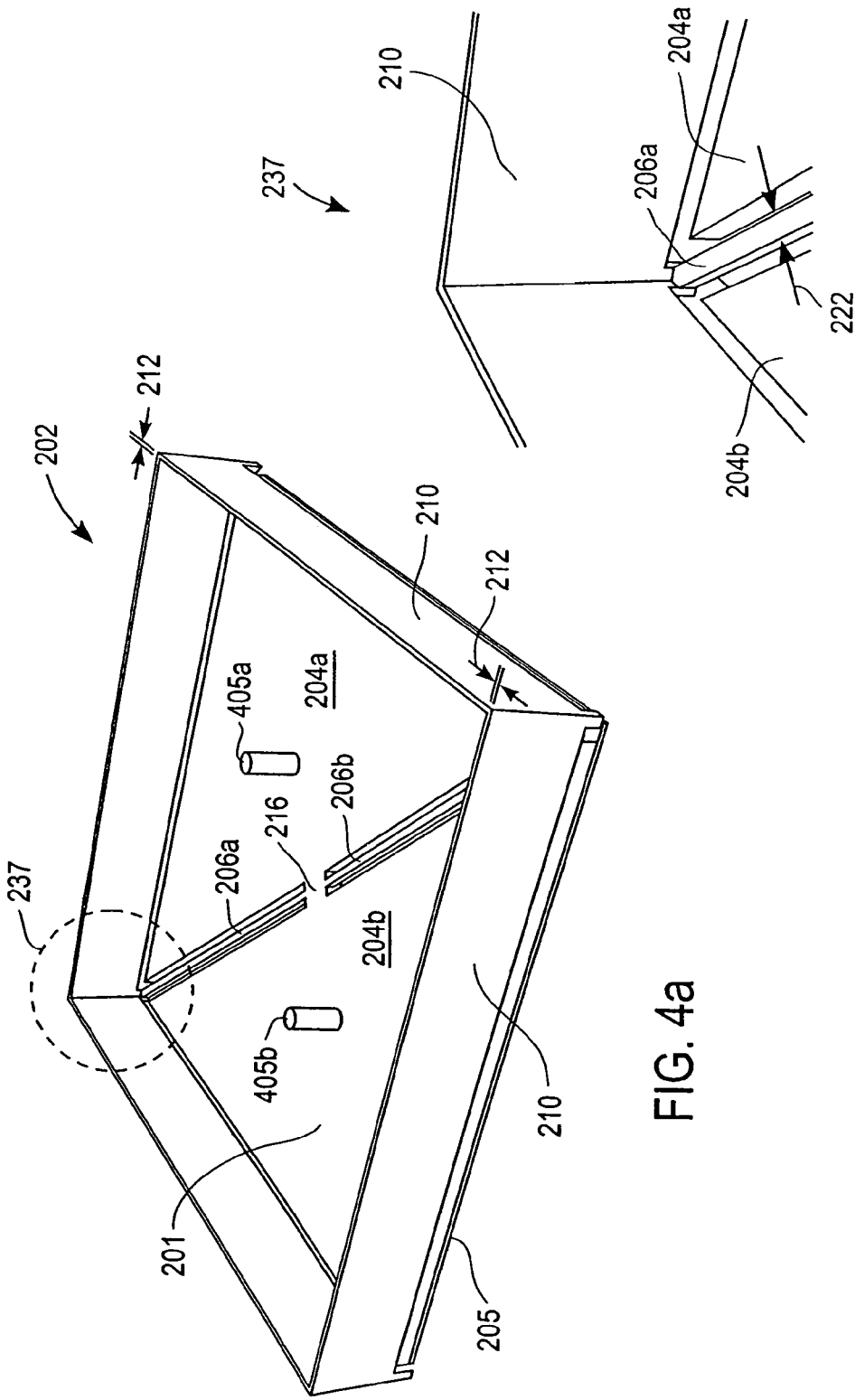
FIG. 4a is a perspective view showing the bottom and sides of a single micro mirror in one embodiment of the invention.
FIG. 4b is a perspective view of a corner of the micro mirror of FIG. 4b.

FIG. 4a is a perspective view illustrating the underside of a single micro mirror 202, including the support walls 210, the mirror plate 204 (including sides 204a and 204b and having an upper surface 205 and a lower surface 201), the hinge 206, the connector 216 and mechanical stops 405a and 405b. FIG. 4b is a more detailed perspective view of a corner 237 of the micro mirror 202 shown in FIG. 4a.

Figure 5:
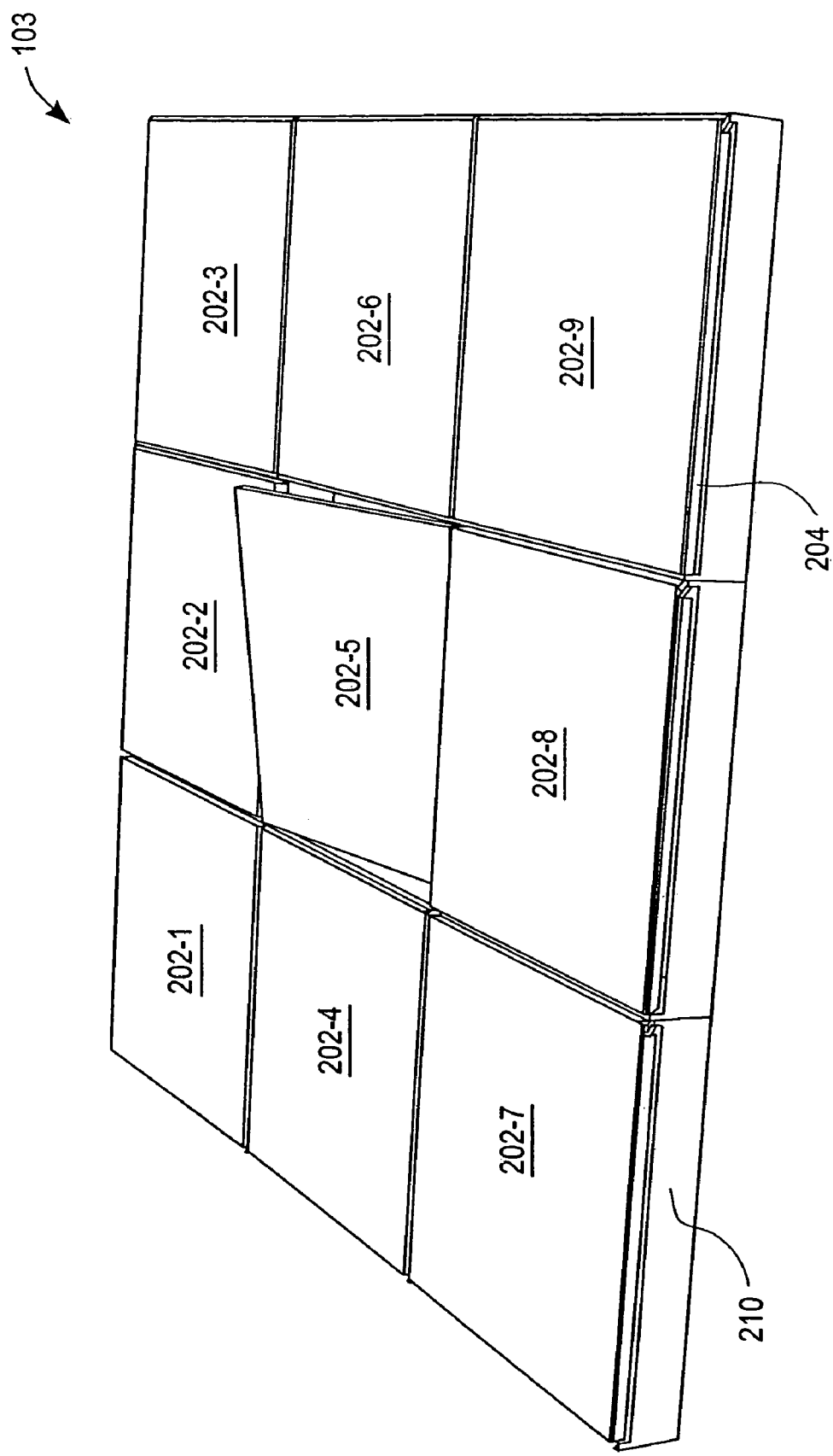
FIG. 5 is a perspective view showing the top and sides of a micro mirror array in one embodiment of the invention.

FIG. 5 is a perspective view showing the top and sides of a micro mirror array 103 having nine micro mirrors 202-1 through 202-9. While FIG. 5 shows the micro mirror array 103 with three rows and three columns, for a total of nine micro mirrors 202, micro mirror arrays 103 of other sizes are also possible. Typically, each micro mirror 202 corresponds to a pixel on a video display. Thus, larger arrays 103 with more micro mirrors 202 provide a video display with more pixels.

As shown in FIG. 5, the surface of the micro mirror array 103 has a large fill ratio. That is, most of the surface of the micro mirror array 103 is made up of the reflective surfaces 203 of the micro mirrors 202. Very little of the surface of the micro mirror array 103 is non-reflective. As illustrated in FIG. 5, the non-reflective portions of the micro mirror array 103 surface are the areas between the reflective surfaces 203 of the micro mirrors 202. For example, the width of the area between mirror 202-1 and 202-2 is determined by the spacer support wall width 212 and the sum of the width of the gaps between the mirror plates 204 of mirrors 202-1 and 202-2 and the spacer support wall 210. Note that, while the single mirror 202 as shown in FIGS. 2a, 2b, 3, 4a and 4b has been described as having its own spacer support frame 210, there are not typically two separate abutting spacer walls 210 between mirrors such as mirrors 202-1 and 202-2. Rather, there is typically one physical spacer wall of the support frame 210 between mirrors 202-1 and 202-2. Since there is no translational displacement upon deflection of the mirror plates 204, the gaps and the spacer wall width 212 can be made as small as the feature size supported by the fabrication technique. Thus, in one embodiment, the gaps are 0.2 micron, and in another embodiment the gaps are 0.13 micron or less. As semiconductor fabrication techniques allow smaller features, the size of the spacer wall 210 and the gaps can decrease to allow higher fill ratios. Embodiments of the present invention allow high fill ratios. In a preferred embodiment, the fill ratio is 96% or even higher.

Figure 6:
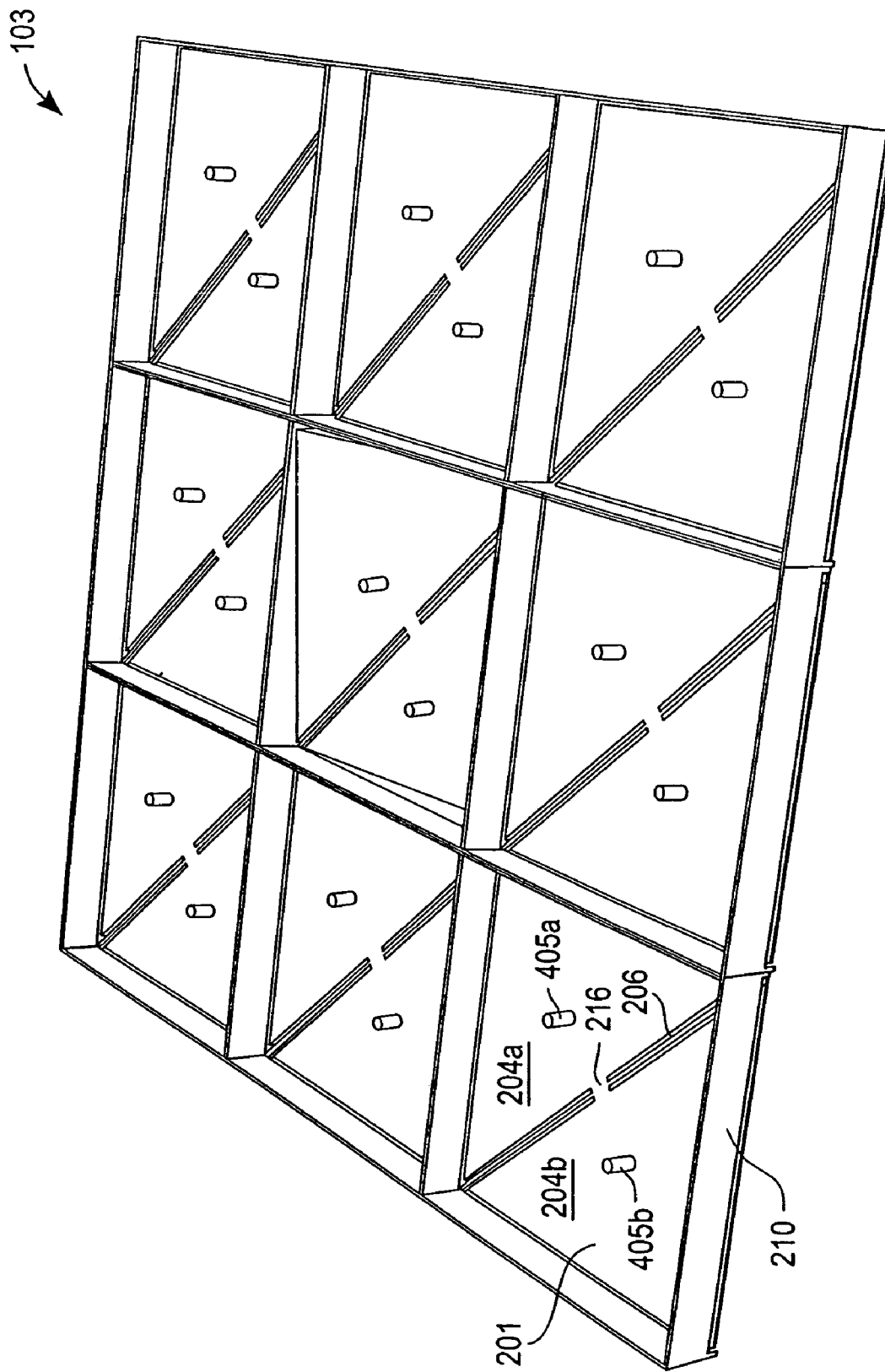
FIG. 6 is a perspective view showing the bottom and sides of a micro mirror array in one embodiment of the invention.

FIG. 6 is a perspective view showing the bottom and sides of the micro mirror array 103 having nine micro mirrors. As shown in FIG. 6, the spacer support frame 210 of the micro mirrors 202 defines cavities beneath the mirror plates 204. These cavities provide room for the mirror plates 204 to deflect downwards, and also allow large areas beneath the mirror plates 204 for placement of the second layer 104 with the electrodes 126, and/or the third layer with the control circuitry 106. FIG. 6 also shows the lower surface 201 of the mirror plates 204 (including sides 204a and 204b), as well as the bottoms of the spacer support frame 210, the torsion spring hinges 206, the connectors 216, and the motion stops 405a and 405b.

As seen in FIGS. 5 and 6, very little light that is normal to the mirror plate 204 can pass beyond the micro mirror array 103 to reach any the electrodes 126 or control circuitry 106 beneath the micro mirror array 103. This is because the spacer support frame 210 and the reflective surface 203 on the upper surface 205 of the mirror plate 204 and above a portion of the hinge 206 provide near complete coverage for the circuitry beneath the micro mirror array 103. Also, since the spacer support frame 210 separates the mirror plate 204 from the circuitry beneath the micro mirror array 103, light traveling at a non-perpendicular angle to the mirror plate 204 and passing beyond the mirror plate 204 is likely to strike a wall of the spacer support frame 210 and not reach the circuitry beneath the micro mirror array 103. Since little intense light incident on the mirror array 103 reaches the circuitry, the SLM 100 avoids problems associated with intense light striking the circuitry. These problems include the incident light heating up the circuitry, and the incident light photons charging circuitry elements, both of which can cause the circuitry to malfunction.

Figure 11:
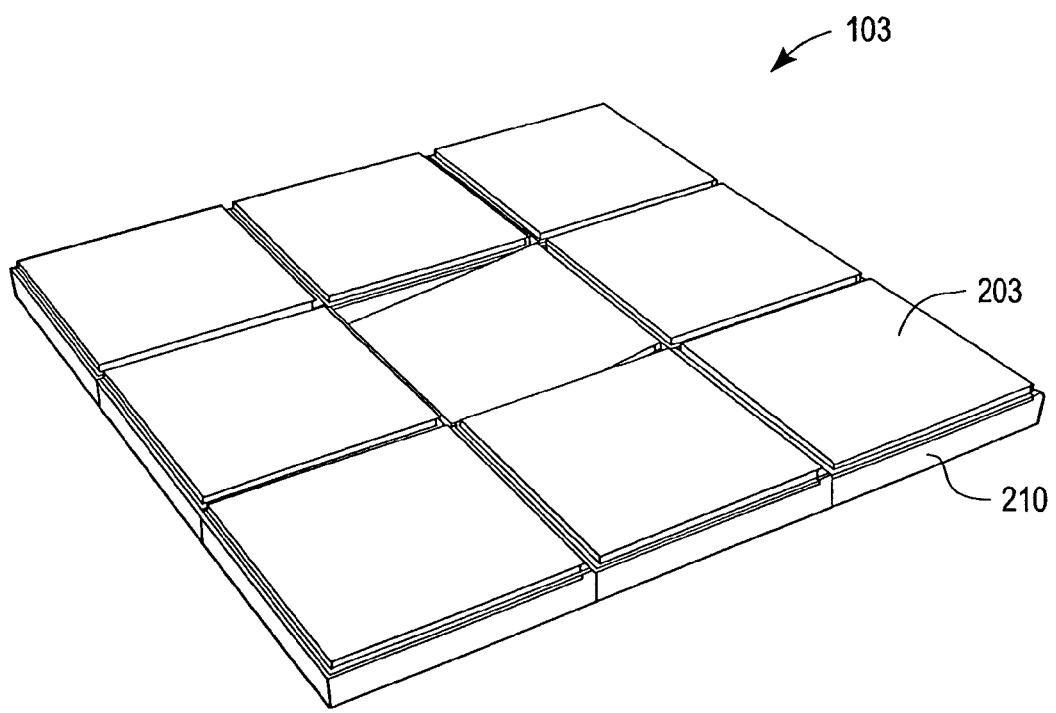
FIG. 11 is a perspective view showing the top and sides of an alternative embodiment of a micro mirror array.
Figure 12:
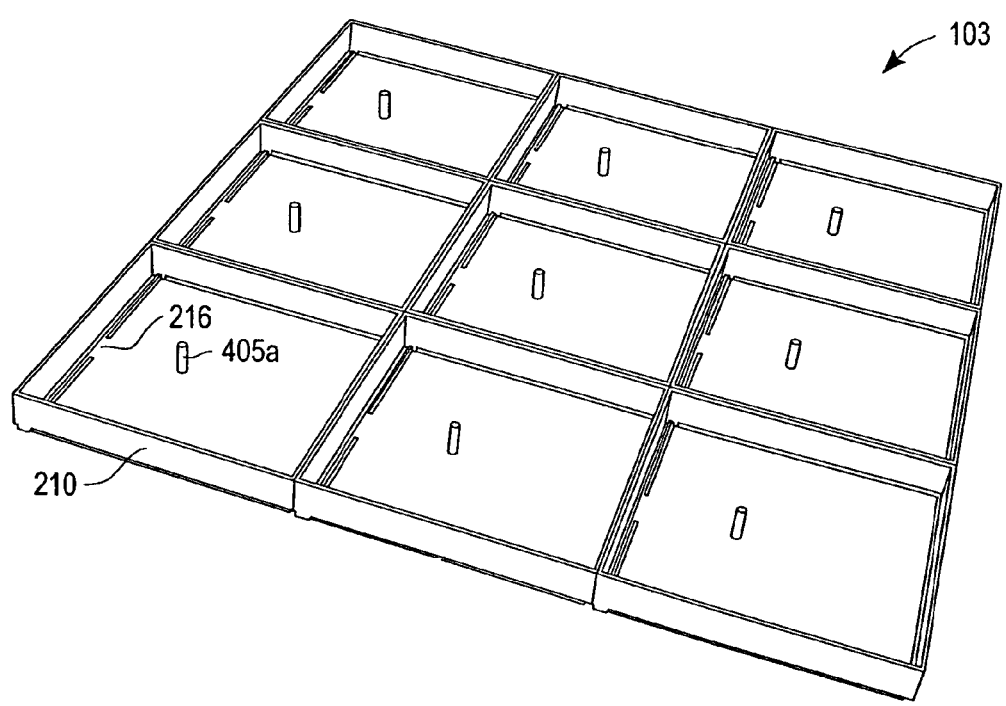
FIG. 12 is a perspective view showing the bottom and sides of an alternative embodiment of a micro mirror array.

FIG. 9a is a perspective view of a micro mirror 202 according to an alternate embodiment of the invention, and FIG. 9b is a more detailed perspective view of a corner 238 of the micro mirror 202. The torsion hinge 206 in this embodiment is parallel to a spacer support wall of the spacer support frame 210. The mirror plate 204 is selectively deflected toward the electrode by applying a voltage bias between the mirror plate 204 and a corresponding electrode 126. The embodiment illustrated in FIG. 9a provides for less total range of angular motion from the same support wall height than the mirror 202 illustrated in FIGS. 2a and 2b with the diagonal hinge 206. Nevertheless, like the embodiment illustrated in FIGS. 2a and 2b, the hinge 206 in the embodiment illustrated in FIGS. 9a and 9b is below the upper surface 205 of the mirror plate 204 and is concealed by a reflective surface 203, resulting in an SLM 100 with high fill ratio, high optical efficiency, high contrast ratio, low diffraction and scattering of light and reliably and cost-effective performance. FIG. 9b is a more detailed perspective view of a corner of the micro mirror 202 and illustrates the mirror plate 204, hinge 206, support wall of the spacer support frame 210 and reflective surface 203. FIG. 10 illustrates the underside of a single micro mirror 202 including hinge 206, connector 216 and motion stop 405a. In other embodiments, the hinge 206 may be substantially parallel to one of the sides of the mirror plate 204 and still be positioned to divide the mirror plate 204 into two parts 405a and 405b. FIGS. 11 and 12 provide perspective views of a mirror array composed of multiple micro mirrors 202 as described in FIGS. 9a, 9b and 10.

Figure 13:
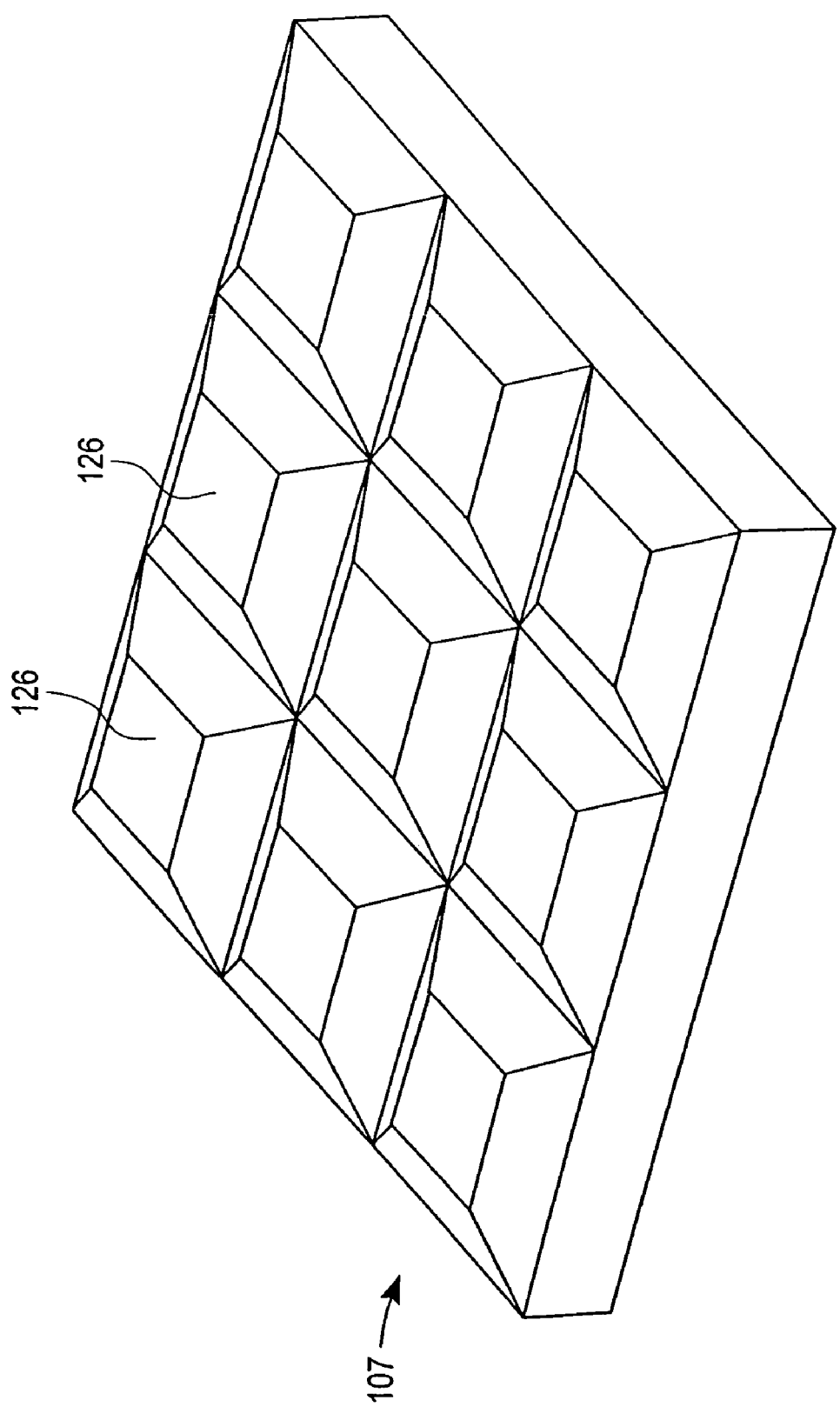
FIG. 13 is a perspective view of one embodiment of the electrodes formed on the second substrate.

FIG. 13 is a perspective view of one embodiment of the electrodes 126 formed on the second substrate 107. In this embodiment, each micro mirror 202 has a corresponding electrode 126. The electrodes 126 in this illustrated embodiment are fabricated to be higher than the rest of the circuitry on the second substrate 107. In a preferred embodiment, the electrodes 126 are located on the same level as the rest of the circuitry on the second substrate 107. In another embodiment, the electrodes 126 extend above the circuitry. In one embodiment of the invention, the electrodes 126 are individual aluminum pads that fit underneath the micro mirror plate. The shape of the electrodes depends upon the embodiment of the micro mirror 202. For example, in the embodiment shown in FIGS. 2a, 2b and 3, there are preferably two electrodes 126 underneath the mirror 202 with each electrode 126 having a triangular shape as shown in FIG. 7b. In the embodiment shown in FIGS. 9a, 9b and 10, there is preferably a single, square electrode 126 underneath the mirror 202. These electrodes 126 are fabricated on the surface of the second substrate 107. The large surface area of the electrodes 126 in this embodiment results in relatively low addressing voltages required to pull the mirror plate 204 down onto the mechanical stops, to cause the full predetermined angular deflection of the mirror plates 204.

Operation:

In operation, individual reflective micro mirrors 202 are selectively deflected and serve to spatially modulate light that is incident to and reflected by the mirrors 202.

Figure 7C:
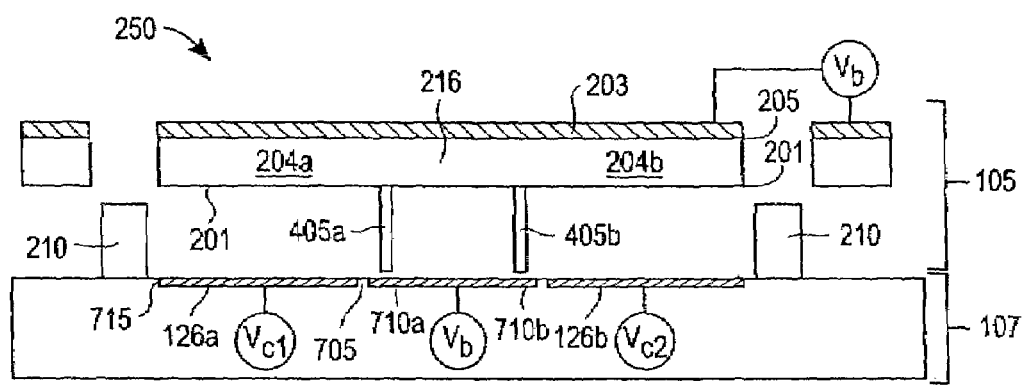
FIG. 7c is a cross sectional view of the undeflected micro mirror shown in FIG. 2a along a center diagonal cross section.

FIGS. 7*a* and 8 illustrate a cross-sectional view of the micro mirror 202 shown along dotted line 251 in FIG. 2*a*. Note that this cross-sectional view is offset from the center diagonal of the micro mirror 202, thereby illustrating the outline of the hinge 206. FIG. 7*c* illustrates a different cross-section view of the micro mirror 202 shown along dotted line 250 in FIG. 2*a*. Note that this cross-sectional view is along the center diagonal, perpendicular to the hinge 206. FIG. 7*c* illustrates the connector 216 in relation to the mirror plates 204*a* and 204*b*. FIGS. 7*a*, 7*c* and 8 show the micro mirror 202 above an electrode 126. In operation, a voltage is applied to an electrode 126 on one side of the mirror 202 to control the deflection of the corresponding part of the mirror plate 204 above the electrode 126 (side 204*a* in FIG. 8). As shown in FIG. 8, when a voltage is applied to the electrode 126, half of the mirror plate 204*a* is attracted to the electrode 126 and the other half of the mirror plate 204*b* is moved away from the electrode 126 and the second substrate 107 due to the structure and rigidity of the mirror plate 204. This causes the mirror plate 204 to rotate about the torsion spring hinge 206. When the voltage is removed from the electrode 126, the hinge 206 causes the mirror plate 204 to spring back to its unbiased position as shown in FIG. 7*a*. Alternatively, in the embodiment with the diagonal hinge 206 illustrated in FIGS. 2*a*, 2*b* and 3, a voltage may be applied to the electrode 126 on the other side of the mirror plate 204 to deflect the mirror 202 in the opposite direction. Thus, light striking the mirror 202 is reflected in a direction that can be controlled by the application of voltage to the electrode 126.

One embodiment is operated as follows. Initially the mirror 202 is undeflected as shown in FIGS. 7*a* and 7*c*. In this unbiased state, an incoming light beam, from a light source, obliquely incident to SLM 100 is reflected by the flat mirror 202. The outgoing, reflected light beam may be received by, for example, an optical dump. The light reflected from the undeflected mirror 202 is not reflected to a video display.

When a voltage bias is applied between half of the mirror plate 204*a* and the electrode 126 below it, the mirror 202 is deflected due to electrostatic attraction. In one embodiment, when the mirror plate 204 is deflected downward as shown in FIG. 8, $V_{e1}$ is preferably 12 volts, $V_b$ −10 volts and $V_{e2}$ 0 volts. Similarly (or conversely), when the micro plate 204*b* is deflected downward, $V_{e1}$ is preferably 0 volts, $V_b$ −10 volts and $V_{e2}$ 12 volts. Because of the design of the hinge 206, one side of the mirror plate 204*a* or 204*b* (namely, the side above the electrode 126 having a voltage bias) is deflected downward (towards the second substrate 107) and the other side of the mirror plate 204*b* or 204*a* is moved away from the second substrate 107. Note that in one preferred embodiment substantially all the bending occurs in the hinge 206 rather than the mirror plate 204. This may be accomplished in one embodiment by making the hinge width 222 thin, and connecting the hinge 206 to the support posts only on both ends. The deflection of the mirror plate 204 is limited by motion stops 405*a* or 405*b*, as described above. The full deflection of the mirror plate 204 deflects the outgoing reflected light beam into the imaging optics and to the video display.

When the mirror plate 204 deflects past the "snapping" or "pulling" voltage (approximately 12 volts or less in one embodiment), the restoring mechanical force or torque of the hinge 206 can no longer balance the electrostatic force or torque and the half of the mirror plate 204 having the electrostatic force under it, 204*a* or 204*b*, "snaps" down toward the electrode 126 under it to achieve full deflection, limited only by the motion stop 405*a* or 405*b*, as applicable. In the embodiment where the hinge 206 is parallel to a support wall of the spacer support frame 210 as shown in FIGS. 9*a*, 9*b* and 10, to release the mirror plate 204 from its fully deflected position, the voltage must be turned off. In the embodiment where the hinge 206 is diagonal as shown in FIGS. 2*a*, 2*b* and 3, to release the mirror plate 204 from its fully deflected position, the voltage must be turned off while the other electrode is being energized and the mirror 202 is attracted to the other side.

The micro mirror 202 is an electromechanically bistable device. Given a specific voltage between the releasing voltage and the snapping voltage, there are two possible deflection angles at which the mirror plate 204 may be, depending on the history of mirror 202 deflection. Therefore, the mirror 202 deflection acts as a latch. These bistability and latching properties exist since the mechanical force required for deflection of the mirror 202 is roughly linear with respect to deflection angle, whereas the opposing electrostatic force is inversely proportional to the distance between the mirror plate 204 and the electrode 126.

Since the electrostatic force between the mirror plate 204 and the electrode 126 depends on the total voltage difference between the mirror plate 204 and the electrode 126, a negative voltage applied to a mirror plate 204 reduces the positive voltage needed to be applied to the electrode 126 to achieve a given deflection amount. Thus, applying a voltage to a mirror array 103 can reduce the voltage magnitude requirement of the electrodes 126. This can be useful, for example, because in some applications it is desirable to keep the maximum voltage that must be applied to the electrodes 126 below 12V because a 5V switching capability is more common and cost-effective in the semiconductor industry.

Since the maximum deflection of the mirror 202 is fixed, the SLM 100 can be operated in a digital manner if it is operated at voltages past the snapping voltage. The operation is essentially digital because, in the embodiment where the hinge 206 is parallel to a support wall of the spacer support frame 210 as shown in FIGS. 2*a*, 2*b* and 3, the mirror plate 204 is either fully deflected downward by application of a voltage to the associated electrode 126 or is allowed to spring upward, with no voltage applied to the associated electrode 126. In the embodiment with the hinge 206 diagonal as shown in FIGS. 12*a*, 12*b* and 13, the mirror plate 204 is either fully deflected downward by application of a voltage to the associated electrode 126 on one side of the mirror plate 204 or deflected downward to the other side of the mirror plate 204 when energizing the other electrode 126 on the other side of the mirror plate 204. A voltage that causes the mirror plate 204 to fully deflect downward until stopped by the physical elements that stop the deflection of the mirror plate 204 is known as a "snapping" or "pulling" voltage. Thus, to deflect the mirror plate 204 fully downward, a voltage equal or greater to the snapping voltage is applied to the corresponding electrode 126. In video display applications, when the mirror plate 204 is fully deflected downward, the incident light on that mirror plate 204 is reflected to a corresponding pixel on a video display screen, and the pixel appears bright. When the mirror plate 204 is allowed to spring upward, the light is reflected in such a direction so that it does not strike the video display screen, and the pixel appears dark.

During such digital operation, it is not necessary to keep the full snapping voltage on an electrode 126 after an associated mirror plate 204 has been fully deflected. During an "addressing stage," voltages for selected electrodes 126 that correspond to the mirror plates 204 which should be fully deflected are set to levels required to deflect the mirror plates 204. After the mirror plates 204 in question have deflected due to the voltages on electrodes 126, the voltage required to hold the mirror plates 204 in the deflected position is less than that required for the actual deflection. This is because the gap between the deflected mirror plate 204 and the addressing electrode 126 is smaller than when the mirror plate 204 is in the process of being deflected. Therefore, in the "hold stage" after the addressing stage the voltage applied to the selected electrodes 126 can be reduced from its original required level without substantially affecting the state of deflection of the mirror plates 204. One advantage of having a lower hold stage voltage is that nearby undeflected mirror plates 204 are subject to a smaller electrostatic attractive force, and they therefore remain closer to a zero-deflected position. This improves the optical contrast ratio between the deflected mirror plates 204 and the undeflected mirror plates 204.

With the appropriate choice of dimensions (in one embodiment, spacer support frame 210 separation between the mirror plate 204 and the electrode 126 of 1 to 5 microns depending on mirror structure and deflection angle requirements, and hinge 206 thickness of 0.05 to 0.45 microns) and materials (such as single crystal silicon (100)), a reflective SLM 100 can be made to have an operating voltage of only a few volts. The shear modulus of the torsion hinge 206 made of single crystal silicon may be, for example, $5 \times 10^{10}$ Newton per meter-squared per radium. The voltage at which the electrode 126 operates to fully deflect the associated mirror plate 204 can be made even lower by maintaining the mirror plate 204 at an appropriate voltage (a "negative bias"), rather than ground. This results in a larger deflection angle for a given voltage applied to an electrode 126. The maximum negative bias voltage is the releasing voltage, so when the addressing voltage reduced to zero the mirror plate 204 can snap back to the undeflected position It is also possible to control the mirror plate 204 deflections in a more "analog" manner. Voltages less than the "snapping voltage" are applied to deflect the mirror plate 204 and control the direction in which the incident light is reflected.

Alternate Applications:

Aside from video displays, the spatial light modulator 100 is also useful in other applications. One such application is in maskless photolithography, where the spatial light modulator 100 directs light to develop deposited photoresist. This removes the need for a mask to correctly develop the photoresist in the desired pattern.

Although the invention has been particularly shown and described with reference to multiple embodiments, it will be understood by persons skilled in the relevant art that various changes in form and details can be made therein without departing from the spirit and scope of the invention. For example, the mirror plates 204 may be deflected through methods other than electrostatic attraction as well. The mirror plates 204 may be deflected using magnetic, thermal, or piezo-electric actuation instead.

We claim:

1. A micro mirror comprising:
   a mirror plate formed from a first portion of a single piece of silicon bearing material, the mirror plate having an upper surface and a lower surface;
   a hinge formed from a second portion of the single piece of silicon bearing material and connected to the mirror plate for allowing the mirror plate to rotate relative to a longitudinal axis of the hinge; and
   a reflective surface on the upper surface of the mirror plate and above a portion of the hinge.

2. The micro mirror of claim 1, wherein the reflective surface substantially conceals the hinge.

3. The micro mirror of claim 1, wherein the hinge is formed substantially beneath the tipper surface of the mirror plate and is substantially concealed by the reflective surface.

4. The micro mirror of claim 1, further comprising a spacer support frame, the hinge connected to the spacer support frame.

5. The micro mirror of claim 4, wherein the hinge has a first arm and a second arm, each arm having two ends, one end the spacer support frame and the other end connected to a connector to the mirror plate.

6. The micro mirror of claim 1, wherein the reflective surface comprises a deposited layer with an area greater than an area of the upper surface of the mirror plate.

7. The micro mirror of claim 4, wherein the mirror plate, the hinge, and the spacer support frame are fabricated from the single piece of silicon bearing material.

8. The micro mirror of claim 7, wherein the single piece of silicon bearing material is a single crystal silicon wafer.

9. The micro mirror of claim 1, wherein the hinge is a torsion spring having a width of between about 0.12 microns to about 0.2 microns and a depth of between about 0.2 microns to about 0.3 microns.

10. The micro mirror of claim 1, further comprising a motion stop, the motion stop attached to the lower surface of the mirror plate for stopping rotation of the mirror plate about the longitudinal axis of the hinge beyond a predetermined angle.

11. The micro mirror of claim 4, wherein the spacer support frame includes at least one wall for supporting the mirror plate, the wall having a thickness of about 1 micron or less.

12. The micro mirror of claim 4, further comprising a control substrata connected to the spacer support frame and having an electrode for receiving a voltage, the voltage used to apply a bias between the mirror plate and the electrode to controllably deflect the mirror plate of the micro mirror.

13. The micro mirror of claim 12, wherein the hinge divides the mirror plate into a first part and a second part, such that when the first part of the mirror plate moves toward the control substrate as the mirror rotates about the longitudinal axis defined by the hinge, the second part of the mirror plate moves away from the control substrate.

14. The micro mirror of claim 11, wherein the spacer support frame has four walls positioned orthogonally to support the mirror plate and the hinge and the rotation of the mirror about an axis defined by the hinge.

15. The micro mirror of claim 11, wherein the hinge is parallel to the wall of the spacer support frame.

16. The micro mirror of claim 11, wherein the hinge is diagonally oriented with respect to the spacer support frame.

17. An array of micro mirrors, comprising:
a plurality of mirror plates fabricated from first regions of a substrate, a mirror plate having an upper surface and a lower surface;
a plurality of hinges fabricated from second regions of the substrate, a hinge coupled to the mirror plate for allowing the mirror plate to rotate relative to the spacer support frame about an axis defined by the hinge; and
a plurality of reflective surfaces, a reflective surface on the upper surface of the mirror plate and above a portion of the hinge.

18. The array of micro mirrors of claim 17, wherein the reflective surface substantially conceals the hinge and has an area greater than an area of the upper surface of the mirror plate.

19. The array of micro mirrors of claim 17, wherein the hinge is formed substantially beneath the upper surface of the mirror plate and is substantially concealed by the reflective surface.

20. The array of micro mirrors of claim 17, further comprising a spacer support frame with walls defining a plurality of cavities, each cavity corresponding to a micro mirror.

21. The array of micro mirrors of claim 20, wherein the mirror plate, the hinge and the spacer support frame are fabricated from the substrate.

22. The array of micro mirrors of claim 21, wherein the substrate is a single crystal silicon substrate.

23. The array of micro mirrors of claim 17, further comprising a plurality of motion stops, a motion stop attached to the lower surface of the mirror plate for stopping rotation of the mirror plate relative to the spacer support frame when the minor plate has rotated to a predetermined angle.

24. The may of claim 20, further comprising a control substrate connected to the spacer support frame and having at least one electrode corresponding to each of the plurality of mirror plates for receiving a voltage, the voltage used to apply a bias between the mirror plate and the electrode to controllably deflect the mirror plate of the micro mirror.

25. The array of claim 24, wherein the hinge divides the mirror plate into a first part and a second part, such that when the first part of the mirror plate moves toward the control substrate as the mirror plate rotates about the axis defined by the hinge, the second part of the mirror plate moves away from the control substrate.

26. The my of claim 24, wherein the control substrate further comprises addressing and control circuitry for selectively applying voltages to the plurality of electrodes to selectively controllably deflect the mirror plates in the array.

27. The array of claim 17, wherein the reflective surfaces in array make up as much as 94.5% of the surface area of the array.

28. An array of a plurality of micro mirrors, comprising:
a first micro mirror fabricated out of a single crystal silicon wafer, the first micro mirror plate comprising;
a first mirror plate having a first upper surface and a first lower surface,
a first hinge connected to the first mirror plate for allowing the first mirror plate to rotate relative to a longitudinal axis of the first hinge, and
a first reflective surface on the first upper surface of the first mirror plate and above the first hinge; and
a second micro mirror fabricated out of the single crystal silicon wafer, the second micro mirror plate comprising:
a second mirror plate having a second upper surface and a second lower surface,
a second hinge connected to the second mirror plate for allowing the second mirror plate to rotate relative to a longitudinal axis of the second hinge, and
a second reflective surface on the second upper surface of the second minor plate and above the second hinge.

29. The array of a plurality of micro mirrors of claim 28, wherein the first micro mirror and the second micro mirror further comprise a spacer support frame, the first hinge connected to the spacer support frame for the first micro mirror and the second hinge connected to the spacer support frame for the second micro mirror.

30. The array of claim 28, wherein the first and second mirror plates are substantially square in shape.

31. The array of claim 28, wherein the first and second mirror plates are substantially triangular in shape.

32. The array of claim 28, wherein the first and second upper surfaces have an area of approximately 225 square microns.

33. A spatial light modulator, comprising:
means for selecting a micro mirror to deflect in an array of micro mirrors;
means for applying a voltage to an electrode corresponding to the selected micro mirror causing the micro mirror to rotate about a hinge, the hinge positioned substantially beneath an upper surface and under a reflective surface of the micro mirror, and permitting light striking the micro mirror to be reflected in a desired direction; and
wherein the micro mirror further has a mirror plate upon which the reflective surface is deposited and a spacer support frame, each of the hinge, mirror plate and spacer support frame are not deposited, but fabricated from a wafer consisting essentially of a single material.

34. The spatial light modulator of claim 33, further comprising means for removing the voltage from the electrode corresponding to the selected micro mirror permitting the micro mirror to return to an unbiased position.

35. A spatial light modulator, comprising:
means for deflecting having an upper surface, said means for deflecting fabricated from a wafer of single crystal silicon;
means for rotating the deflecting means about an axis, said means for rotating also fabricated from the wafer of single crystal silicon; and
means for reflecting light, the reflecting means deposited on the upper surface of the deflecting means and above the rotating means to substantially conceal the rotating means.

* * * * *